Feb. 16, 1932.    G. W. GILMER    1,845,871
AUTOMOTIVE VEHICLE
Filed May 1, 1929
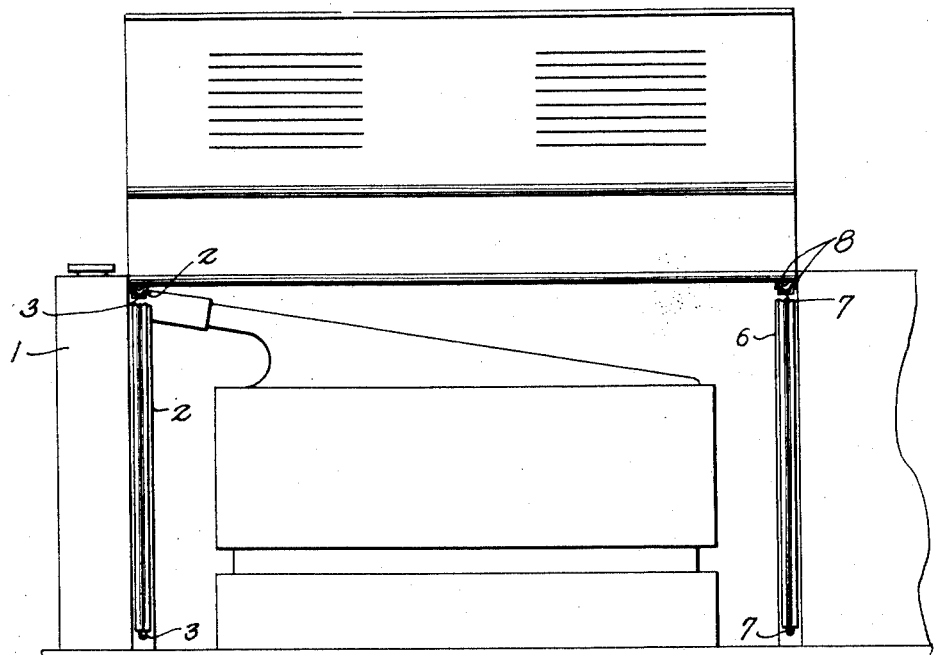
Fig.1.
 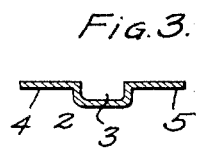 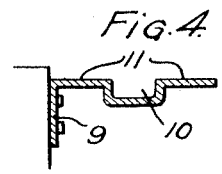 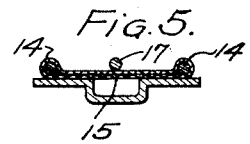
Fig.2.   Fig.3.   Fig.4.   Fig.5.
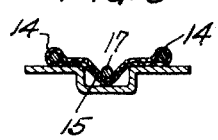 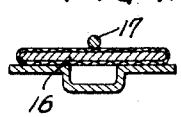  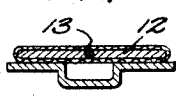
Fig.6.   Fig.7.   Fig.8.   Fig.9.
 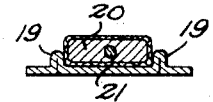 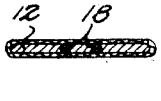 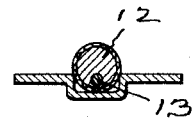
Fig.10.   Fig.11.   Fig.12.   Fig.13.
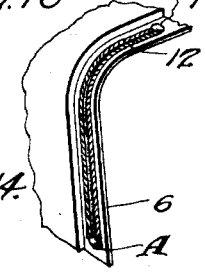
Fig.14.
Inventor
George Walker Gilmer
By Edwin S. Clarkson
Attorney Patented Feb. 16, 1932

1,845,871

UNITED STATES PATENT OFFICE

GEORGE WALKER GILMER, OF DETROIT, MICHIGAN

AUTOMOTIVE VEHICLE

Application filed May 1, 1929. Serial No. 359,637.

My invention relates to improvements in automotive vehicles, and particularly to that portion of the radiator and cowl upon which the engine hood rests, such portion on the radiator is usually referred to as the shell and more specifically to that portion of the shell which is generally referred to as the radiator ledge or front hood ledge. This ledge is that portion of the shell on which it is common practice to attach an anti-squeak material or pad material (here-in-after referred to as pad) to form a cushion on which the hood or engine cover is seated when in closed position.

In common practice the pad is riveted, or otherwise, attached to the ledges usually at a number of points intermediate of the ends of the pad. The hood when locked in closed position bears an unfixed relation to the ledges and pad, consequently, the weaving motion set up in the hood by the passage of the vehicle over the uneven surfaces causes the hood to rub on the pad. The pad also between points of fastening bears an unfixed relation to the ledges allowing it to move between these points with the hood. This movement causes wear on the pad, stretches it and pushes it out of line causing it to lose some of its effectiveness and become unsightly. The fastening means, usually rivets or screws, are apt to extend above the surface plane of the pad and cause metallic contact between the hood and the ledges which defeats the function of the pad.

My invention consists of rolling, pressing, stamping, or otherwise locating a groove, or grooves, in the ledges so that the pad for a portion or all of its width and for a portion or all of its length may be depressed below the normal surface of the ledges and fixed securely in said pressed down portion, or portions, leaving the surface of the pad on which the hood rests to extend above the ledge surface so as to fulfill its function in holding the hood and ledge in spaced apart relation. The portion, or portions, of the pad depressed into the groove is held by the sides of the groove against lateral movement while the fastenings (to be later referred to) will prevent longitudinal movement. The fastening means may be a cement or glue or prongs, cut and bent out of plane from the ledge itself, which engage the pad and hold it in position, or if the pad is sufficiently rigidified by a proper stiffening means it may be fastened at intervals with rivets, or by other means, or preferably, a stiffening, or stiffening and fastening element may be placed in or on the pad, or a portion, or portions of the pad down into the groove, or grooves. The pad may be of any structure or composition from which a satisfactory pad material may be made, though a woven and treated cotton is generally used for this purpose.

The attached drawings show simple and generally effective methods of fixing the lace to a ledge as above described. In one method a wire (or wires) or rigidifying strip is passed longitudinally through the lace so that there is no possibility of metal to metal contact. At, or near the ends of the pad the wire is securely fastened to the ledges. The ends may be fastened with rivets, or bolts, or by turning the wire through holes located for the purposes, or in any other manner as the particular method of fastening of the ends will depend largely on the design of the part on which a pad is to be used and will have no bearing on my claims of a retaining groove, ribs or beads. It is apparent that while I have described a groove the groove effect may be obtained by ribs or beads in the ledge and I claim coverage for such methods.

After fastening one end of the wire the other end should be pulled to take up the slack. This tightening will draw the wire and that portion of the pad material directly under the wire down into the groove so as to firmly fix the pad in position against lateral movement. In some constructions the method of tightening this wire may vary and an auxiliary tensioning element or elements used. For example, the wire may be pulled fairly tight when fastening the second end and then split rivets which straddle the wire are driven through holes in the groove.

Where the stiffening and fastening means is placed on top of the pad it draws the entire underlying part of the pad material down into the groove. In this case while the wire or stiffening element is not hidden it may be drawn sufficiently deep in the groove so that metal to metal contact between the ledge and hood is impossible.

When the pad is fastened to an automobile in position in accordance with the above description of my invention it cannot move in any direction. There is no relative movement between the pad and the ledges and therefore wear is confined entirely to the upper surface of the pad on which the hood rests. Being thoroughly anchored to the ledges the pad in addition to serving as a cushion acts as a brake to help slow down the movement of the hood thereby lessening the wear on the contact surface. Generally this pad can be attached in such a manner that metal to metal contact between the hood and the ledges is impossible except where the hood is anchored to the ledges.

In the drawings:

Figure 1 is a side elevation of a portion of an automobile showing my invention applied, one side of the engine hood being raised and parts being in section.

Figure 2 is an enlarged detail sectional view of the pad seat and pad.

Figure 3 is an enlarged detail sectional view of the pad seat.

Figure 4 is an enlarged detail sectional view of another embodiment of my invention.

Figures 5, 6, 7, 8, 9, 10 are enlarged detail sectional views of the pad seat and pad showing different types of pads.

Figure 11 is an enlarged detail sectional view of another embodiment of my improved pad seat.

Figure 12 is an enlarged detail sectional view of another type of pad.

Figure 13 is a detail sectional view of another type of pad.

Figure 14 is a detail perspective view of a part of the cowl and ledge with my pad thereon.

In the drawings 1 designates a suitable type of radiator for motor vehicles having the hood ledge 2, which ledge, according to my invention, is provided with an elongated groove 3 which extends longitudinally along the sides and top of the ledge, the ledge affording flat planes 4 and 5 on each side of the groove 3.

The reference numeral 6 designates a hood ledge formed on the cowl of the automobile body, said ledge being provided with an elongated groove 7 extending longitudinally of the ledge, the flat portions 8 of the ledge providing flat planes on each side of the groove.

In some vehicles the hood ledge is formed separate from the body and radiator and for this case I provide an attachment shown in Figure 4 which consists of the angle iron 9 having a flange in which a groove 10 is formed, there being flat planes 11 on each side of the groove.

My improved pad 12 is preferably provided with a rigidifying element 13, which rigidifying element is composed of a wire of any desired cross section positioned within the pad and extending from end to end of the pad, the ends of the wire extending beyond the ends of the pad whereby they may be secured in a suitable hole provided in the ledges, or by a rivet whereby the pad is held in alignment from end to end against transverse movement on deflection. One end of the wire is firmly secured in place and the pad is then placed over the ledge and pressure is exerted on the wire which thereby depresses the central portion of the pad into the groove of the ledge thus securely locking the pad on its seat. The side walls of the groove cooperate with the wire to prevent movement of the pad transverse of the seat thereby insuring at all times a pad between the engine hood and the ledges on which it rests, thus eliminating all possibility of the metal of the hood contacting the metal of the ledges, or the rigidifying element.

As shown in Figures 5 and 6, the pad may have thickened side marginal portions 14 with the relative thin web 15 connecting them. While in Figures 7 and 8 the pad 16 is shown as of equal cross sectional area. In these constructions the wire 17 is not physically connected to the pad, and on drawing the wire tight to position the pad is drawn down into the groove by the wire as shown in Figures 6 and 8.

In Figures 9 and 10 I show the wire embedded in the pad 12, while in Figure 12 I show a plurality of wires 18 in the pad.

It will be readily understood as shown in Figure 11 that instead of depressing a groove in the hood ledge I may form beads, or ribs 19 on the ledge between which the pad 20 is seated and held in such position by means of the rigidifying element 21.

From the above it will be seen that the rigidifying element or wire not only holds the pad in straight alignment throughout its length against sidewise deflection, but it also places tension on the pad and forces it into the groove and the side walls of the groove cooperate with the rigidifying element as a further means of holding the pad against sidewise deflection, besides which, the rigidifying element being positioned below the flat planes of the ledge there is no danger of contact between the metal of the hood and the rigidifying and retaining element.

In some cases automobile manufacturers may prefer to have the pad strip put on in one continuous length throughout the length of the ledge, while in other cases it may be desired to put the pad on in shorter sections, and it will be understood that my invention is adapted to this arrangement.

While I have in detail described several types of pad and fastenings, I do not wish my invention to be limited to such designs of pads or fastenings, the essence of my invention being a seat for a pad which positions or retains and properly locates the pad in a predetermined position to prevent contact of metal to metal, and thus eliminating all squeaks and other noises now experienced in motor vehicle structures.

In Figure 14 I have shown the ends of the pad 12 secured at each end by means of rivets or other desired securing means A.

What I claim is:

1. A pad seat and pad for the hoods of motor vehicles for preventing contact of metal against metal and thus eliminating squeaks, comprising a body having a groove and substantially flat seat surfaces of material width at opposite sides of the groove, a normally substantially flat pad of comparatively thin flexible material having its portions on opposite sides of its longitudinal center lying in contact with said opposite seat surfaces, and fastening means operating to depress the central portion of the pad out of the plane of said side portions of the pad and into the groove and to hold the same seated in said groove.

2. A pad seat and pad for the hoods of motor vehicles for preventing contact of metal against metal, comprising a body having a groove and substantially flat seat surfaces of material width at opposite sides of the groove, a normally substantially flat pad of comparatively thin flexible material having its portions on opposite sides of its longitudinal center lying in contact with said opposite seat surfaces, and a continuous linear fastening element extending longitudinally of the central portion of the pad and operating to depress said central portion of the pad out of the plane of said side portions of the pad and into the groove and to hold the same seated in said groove.

3. A pad seat and pad for the hoods of motor vehicles for preventing contact of metal against metal, comprising a body having a groove and substantially flat seat surfaces of material width at opposite sides of the groove, a normally substantially flat pad of comparatively thin flexible material having its portions on opposite sides of its longitudinal center lying in contact with said opposite seat surfaces, and fastening means lying centrally of the pad between its outer and inner surfaces and operating to depress said central portion of the pad out of the plane of said side portions of the pad and into the groove and to hold the same seated in said groove.

4. A pad seat and pad for the hoods of motor vehicles for preventing contact of metal against metal, comprising a body having a groove and substantially flat seat surfaces of material width at opposite sides of the groove, a normally substantially flat pad of comparatively thin flexible material having its portions on opposite sides of its longitudinal center lying in contact with said opposite seat surfaces, and a continuous linear fastening element lying centrally of the pad between its outer and inner faces and operating to depress said central portion of the pad out of the plane of said side portions of the pad and into the groove and to hold the same seated in said groove.

5. A pad seat and pad for the hoods of motor vehicles comprising a seat member having a groove and substantially flat seat surfaces at opposite sides of the groove, and a normally substantially flat pad of comparatively thin flexible material overlying said seat member, and a linear fastening element lying centrally of the pad between its outer and inner faces and operating to depress the central portion of the pad out of its normal plane and into the groove and to secure the same therein, the side portions of the pad overlapping said opposite seat surfaces.

In testimony whereof I affix my signature.

GEORGE WALKER GILMER.